US008628830B2

(12) United States Patent
Amon et al.

(10) Patent No.: US 8,628,830 B2
(45) Date of Patent: Jan. 14, 2014

(54) METHOD OF AND DEVICE FOR MODIFYING THE PROPERTIES OF A MEMBRANE FOR AN ELECTROACOUSTIC TRANSDUCER

(75) Inventors: Stefan Amon, St. Pölten (AT); Ewald Frasl, Biedermannsdorf (AT)

(73) Assignee: Knowles Electronics Asia Pte. Ltd., Singapore (SG)

( * ) Notice: Subject to any disclaimer, the term of this patent is extended or adjusted under 35 U.S.C. 154(b) by 810 days.

(21) Appl. No.: 10/589,923

(22) PCT Filed: Feb. 8, 2005

(86) PCT No.: PCT/IB2005/050500

§ 371 (c)(1), (2), (4) Date: Aug. 17, 2006

(87) PCT Pub. No.: WO2005/084076

PCT Pub. Date: Sep. 9, 2005

(65) Prior Publication Data

US 2007/0178242 A1 Aug. 2, 2007

(30) Foreign Application Priority Data

Feb. 17, 2004 (EP) .................................... 04100628

(51) Int. Cl.
*C08F 2/48* (2006.01)
*G10K 13/00* (2006.01)
*H04R 7/00* (2006.01)

(52) U.S. Cl.
USPC .......................................... 427/508; 181/161

(58) Field of Classification Search
USPC ................................ 181/161, 165, 173, 174
See application file for complete search history.

(56) References Cited

U.S. PATENT DOCUMENTS

| | | | | |
|---|---|---|---|---|
| 2,408,038 A * | 9/1946 | Brennan | ...................... | 181/164 |
| 2,596,364 A * | 5/1952 | Brennan | ...................... | 264/517 |
| 2,716,462 A * | 8/1955 | Brennan | ...................... | 181/169 |
| 3,093,207 A * | 6/1963 | Bozak | ...................... | 181/166 |
| 3,596,733 A * | 8/1971 | Bertagni | ...................... | 381/431 |
| 4,324,312 A * | 4/1982 | Durbin | ...................... | 181/171 |
| 4,668,588 A * | 5/1987 | Kishima | ...................... | 428/412 |
| 5,961,762 A | 10/1999 | Zelinka et al. | | |

FOREIGN PATENT DOCUMENTS

| | | | |
|---|---|---|---|
| DE | 27 47 067 A1 | 4/1979 | |
| JP | 01193847 A * | 8/1989 | ............... G03C 1/74 |
| JP | 04120900 A * | 4/1992 | |
| WO | WO 89/00372 | 1/1989 | |

OTHER PUBLICATIONS

Asif (European Polymer Journal 39 (2003) 933-938.*

(Continued)

*Primary Examiner* — Michael Cleveland
*Assistant Examiner* — Joel Horning
(74) *Attorney, Agent, or Firm* — Jonathan Giroux; Dykema Gossett PLLC

(57) ABSTRACT

In a method of and a device for producing a membrane (1) for an electroacoustic transducer, the procedure is such that a membrane (1), which has been produced for example by deep-drawing, is at least partially coated on at least one surface with a liquid plastic (7), in particular a plastic adhesive, and this liquid plastic is cured.

10 Claims, 4 Drawing Sheets

(56) References Cited

OTHER PUBLICATIONS

The definition of "ultraviolet" (retrieved from dictionary.com Jun. 3, 2010).*

International Preliminary Report on Patentability for International Application No. PCT/IB2005/050500, filed on Feb. 8, 2005.

Machine English translation of Specification and Claims of DE 27 47 067, retrieved on Mar. 16, 2010.

* cited by examiner

METHOD OF AND DEVICE FOR MODIFYING THE PROPERTIES OF A MEMBRANE FOR AN ELECTROACOUSTIC TRANSDUCER

FIELD OF THE INVENTION

The invention relates to a method of producing a membrane for an electroacoustic transducer.

The invention furthermore relates to a device for producing a membrane for an electroacoustic transducer.

BACKGROUND OF THE INVENTION

In connection with the production of a membrane for an electroacoustic transducer and specifically for a loudspeaker, for example for small loudspeakers for mobile telephones, it is known, in the case of currently available membranes produced for example by means of a deep-drawing process, that although increasingly high acoustic pressures are to be generated, the membrane tends to buckle during operation if such a loudspeaker is small, on account of the thin, film-like structure of the membrane and on account of a relatively flat membrane cup, and this can be perceived acoustically by a user of the mobile telephone and is disruptive and unpleasant. The aim is therefore, even when using thin membranes formed for example by deep-drawn plastic films, to make at least part-areas of such a membrane more rigid in order to provide the necessary strengths even in the case of small membranes for a loudspeaker. In the membranes available to date, which are produced by means of a deep-drawing process, it has not been possible in the case of the desired small size to achieve the necessary rigidity in particular for producing a hard membrane center or membrane cup. Moreover, when producing a membrane for a loudspeaker by means of a deep-drawing process, it is impossible or not readily possible to give the membrane different rigidity properties in different part-areas, for example by virtue of different material thicknesses.

In connection with the production of membranes for loudspeakers having different rigidity properties or material properties, it is known for example from the patent document WO 89/00372 to produce a multilayer membrane, wherein a second plastic film is applied to a first plastic film provided for stabilizing the shape, in order to achieve desired damping properties in respect of partial vibrations. Not only is the production of such a multilayer membrane extremely complicated, but there is also the problem that the films which are to be arranged above one another or applied to one another have a constant material thickness over their entire extent and thus have constant material properties, so that once again in this known design it is not possible to produce a membrane comprising part-areas with different material properties.

In connection with a method of producing a membrane for a loudspeaker or an electroacoustic transducer, it is also known from the patent document AT 403 751 B to fix part-areas of a membrane in a multistage production method and to subject other, non-fixed part-areas to thermal and/or mechanical stress, in order thereby to obtain part-areas with different material thicknesses of the membrane and thus different material properties. This method, too, is disadvantageous in that extremely complicated method steps are required during production.

OBJECT AND SUMMARY OF THE INVENTION

It is an object of the invention to provide a method of the type mentioned above and a device of the type mentioned above in which the abovementioned disadvantages are avoided, and in particular to provide a method and a device for producing a membrane for an electroacoustic transducer, wherein rapid production of a membrane for an electroacoustic transducer with material properties, especially rigidity, which can be influenced or modified in a targeted manner is possible using simple method steps and means.

In order to achieve the abovementioned objects, features according to the invention are provided in a method of producing a membrane for an electroacoustic transducer, so that such a method according to the invention can be characterized in the following manner, namely:

A method of producing a membrane for an electroacoustic transducer, wherein at least one liquid plastic, in particular a liquid plastic with adhesive properties, is applied at least in part-areas of at least one surface of the membrane and wherein the at least one applied liquid plastic is cured.

In order to achieve the abovementioned objects, features according to the invention are provided in a device for producing a membrane for an electroacoustic transducer, so that such a device according to the invention can be characterized in the following manner, namely:

A device for producing a membrane for an electroacoustic transducer, comprising holding means for holding a membrane and comprising at least one application device for applying at least one liquid plastic, in particular a liquid plastic having adhesive properties, to at least part-areas of at least one surface of the membrane, and comprising a curing device for curing the at least one applied liquid plastic.

Providing the features according to the invention means that, using simple method steps and simple means, a membrane produced for example by means of a deep-drawing process can be coated in a targeted manner with at least one liquid plastic and in particular with a liquid plastic having adhesive properties, that is to say with a plastic adhesive, which liquid plastic after curing brings about a correspondingly desired change in the material properties, in particular the rigidity, of the membrane material for the electroacoustic transducer, in order that desired acoustic properties of the electroacoustic transducer can be achieved despite being of a small size.

According to the features of an embodiment wherein the application of the at least one liquid plastic (7) to the membrane (1) takes place by spraying the at least one liquid plastic (7) onto at least the part-areas (3, 4) of at least one surface of the membrane (1), the advantage is obtained that rapid and uniform coating at least of part-areas of the surface of a membrane for an electroacoustic transducer can be carried out.

According to the features of an embodiment wherein different amounts of liquid plastic and/or different types of liquid plastic are applied to different part-areas (3, 4) of the membrane (1), the advantage is obtained that part-areas of a membrane of an electroacoustic transducer, which part-areas are to have different material properties, can be processed in a simple and targeted manner starting from a membrane or membrane film having uniform material properties. Such different material properties, such as different rigidities of part-areas of the membrane of an electroacoustic transducer for example, are in this case used to achieve desired acoustic properties and damping properties. It is assumed, for example, that when using a soft membrane film in a loudspeaker, this membrane film has a high temperature-sensitivity, so that a loudspeaker equipped with such a membrane can be used only within a relatively narrow temperature range. By contrast, when such a membrane is suitably coated in order to achieve a greater hardness, a larger temperature-of-use range of the loudspeaker equipped with a membrane coated according to the invention can be achieved, wherein, in addition to the larger temperature-of-use range, a higher resonant quality is also possible as a result of the greater hardness of the membrane.

According to the measures of an embodiment wherein the curing of the at least one liquid plastic is carried out by means of visible light or by means of UV light (16), rapid and reliable curing of the liquid plastic used to coat the membrane, in particular a plastic adhesive, can be achieved, wherein for example appropriate acrylate adhesives may be employed or used.

According to the measures of an embodiment wherein the at least one liquid plastic is heated following application to the membrane (1) and prior to the curing operation, the advantage is obtained that, following the application of a liquid plastic to the membrane, a reliable and uniform distribution of the liquid plastic is aided by the heating operation and thus, in a subsequent curing step, a uniform coating in the respective part-areas can be achieved in order to obtain uniform material properties of the membrane in each case.

According to the measures of an embodiment wherein the membrane (1) and/or a device (6, 10, 11, 12) for applying the at least one liquid plastic is moved during the application of the at least one liquid plastic, in particular is rotated about its central axis, the advantage is obtained that it is possible to use even small devices to apply the liquid plastic, for example nozzles, wherein the part-areas to be coated can even be coated within a short time by producing a relative movement between the at least one application device for applying the liquid plastic and the membrane or the holding means of the membrane. In this connection, according to the measures of the embodiment wherein the at least one liquid plastic is heated following application to the membrane (1) and prior to the curing operation, a structurally simple solution for circular membranes in particular is provided.

As already mentioned above, using the method according to the invention and the device according to the invention it is possible to give the membrane if necessary different material properties in different part-areas by applying the liquid plastic to the membrane or coating the latter with the liquid plastic. According to the measures of an embodiment wherein different waiting times or residence times of between one and fifteen seconds are selected between the application of the at least one liquid plastic and the curing of the at least one liquid plastic, the advantage is obtained that different material properties of the coating material and also possibly different surface features of the membrane to be coated can be taken into account.

According to the features of an embodiment wherein, in the case of a membrane (1) having a number of raised areas (22) and depressions (20), a waiting time or residence time is selected which is greater than a waiting time or residence time in the case of a membrane having a smooth surface, the advantage is obtained that, in the case of such membranes designed with depressions and creases, even when carrying out a uniform coating with a liquid plastic it is possible for greater amounts of coating material to be collected in the region of the bottom of the depressions by observing longer residence times, so that despite rapid coating or application of the liquid plastic, higher damping for example can be achieved by the greater accumulation of material in the region of the depressions or creases which is obtained by virtue of the longer residence time, wherein the thickness of the applied liquid plastic is minimized in the region of the raised areas between the individual depressions and thus the original properties of the membrane used are essentially retained.

According to the measures of an embodiment wherein the holding means (13) together with the membrane (1) held thereby being transportable, by means of an in particular automatically driven conveying system, from a first position, in which first position the holding means (13) together with the membrane (1) lie essentially opposite the application device (6, 10, 11, 12) for applying the at least one liquid plastic, into a second position, in which second position the holding means (13) together with the membrane (1) lie opposite the curing device (16) for curing the at least one applied liquid plastic, in connection with one design of part-areas with different thicknesses of the applied plastic, the advantage is obtained that, despite a short cycle or rapid procedure, it is possible to use simple means.

According to the measures of an embodiment wherein the ratio between the layer thickness of the at least one applied plastic and the membrane thickness is selected to be between 0.5:1 to 3:1, in particular between approximately 1:1 and 2:1, the advantage is obtained that the desired, in particular mechanical and acoustic, properties of the membrane of an electroacoustic transducer, in particular of a loudspeaker, can be obtained with thin material thicknesses both of the membrane film and of the liquid plastic to be applied, that is to say of the coating material, in particular of a plastic adhesive. The membrane may in this case have a thickness in the range between 10 μm and 150 μm.

According to the features of an embodiment wherein the at least-one liquid plastic is applied to the membrane (1) a number of times in succession and wherein the at least one liquid plastic is cured after each application, the advantage is obtained that, for example using one type of plastic adhesive, depending on the selected number of coating operations, different material properties can be achieved in part-areas of the membrane film by selecting the number of repetitions of the coating operations.

The measures according to the invention cannot only be used in the case of electroacoustic transducers for converting electrical signals into sound, that is to say in loudspeakers, but rather these measures can also be used in electroacoustic transducers for converting sound into electrical signals, that is to say in microphones.

The abovementioned and further aspects of the invention emerge from the examples of embodiments described below and are explained with reference to these examples of embodiments.

BRIEF DESCRIPTION OF THE DRAWINGS

The invention will be further described with reference to examples of embodiments shown in the drawings to which, however, the invention is not restricted.

DESCRIPTION OF PREFERRED EMBODIMENTS

Figure 1:
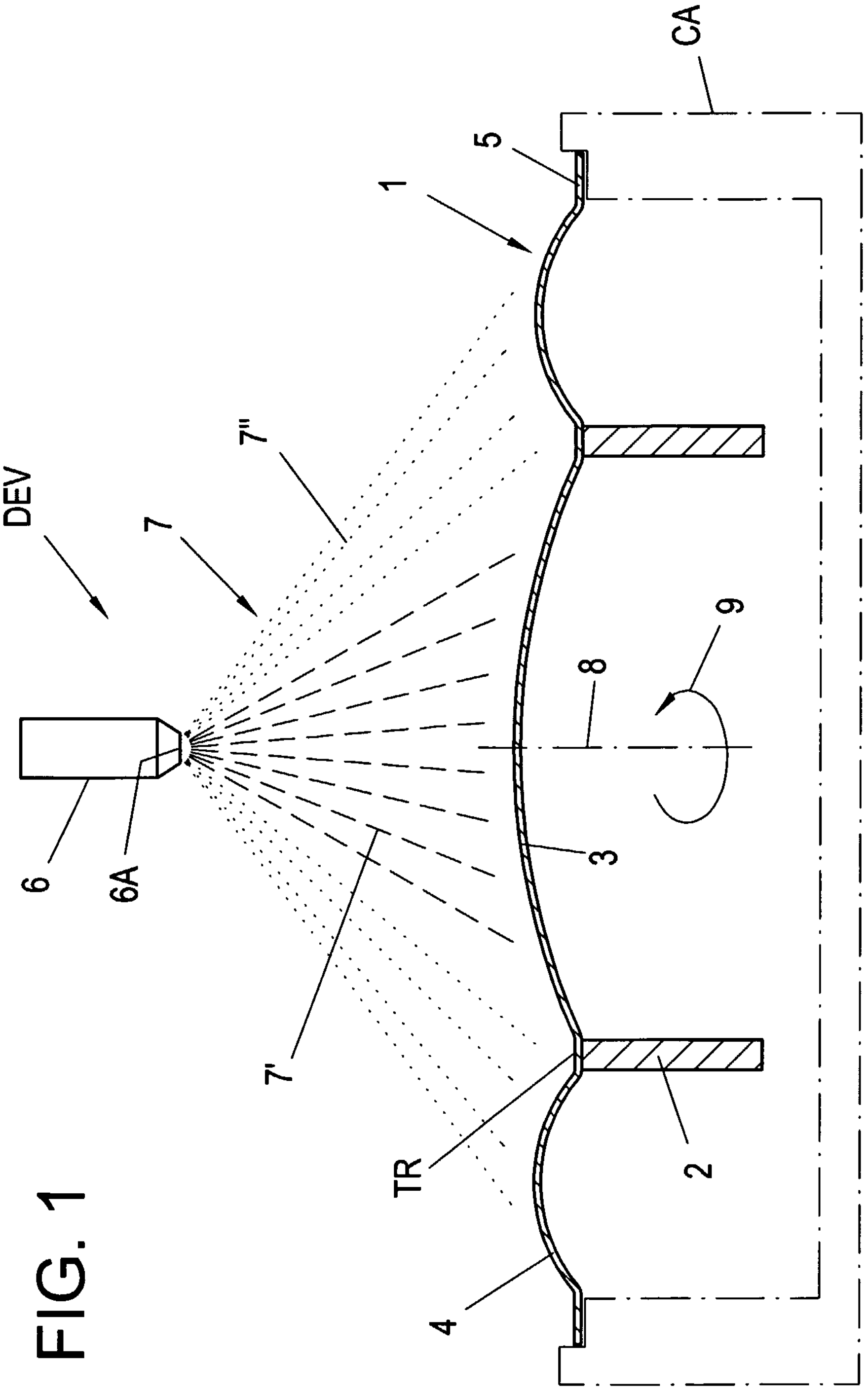
FIG. 1 schematically shows a view of a device according to the invention in accordance with a first example of embodiment of the invention, which device is designed for carrying out the method according to the invention.

FIG. 1 shows a device DEV for producing a membrane 1 for a loudspeaker (not shown), wherein only the membrane 1 and a moving coil 2 of the loudspeaker are shown in section. The membrane 1 has a cup-shaped central area 3 and—as can clearly be seen from FIG. 4—a creased area 4 and an edge area 5. The coil 2 is connected to the membrane 1 in a transition area TR between the central region 3 and the creased region 4. It should be mentioned at this point that the membrane 1 is connected by its edge region 5 to a casing CA of the loudspeaker (not shown), which casing CA forms holding means for ultimately holding the membrane 1 and is shown by dash-dotted lines in FIGS. 1 and 2.

Shown essentially in the center with respect to the membrane 1 is an application device 6 for applying a liquid plastic 7, in particular a plastic adhesive, wherein the application device 6 for applying the liquid plastic is formed by a spray nozzle 6A.

Depending on the spraying angle or opening angle of the spray nozzle 6A, various part-areas of the membrane 1 are coated with the liquid plastic 7 as a function of the properties of the part-areas and consequently of the membrane 1 that are to be achieved, wherein the plastic 7 coming from the spray nozzle 6A in a first spraying region 7' is intended to coat the central region 3 of the membrane 1 and the plastic 7 coming from the spray nozzle 6A in a second spraying region 7" is intended to coat the creased region 4 of the membrane 1.

For uniform coating of a membrane 1 which is essentially symmetrical in rotation, it is moreover provided that the membrane 1 can be driven to rotate about the essentially central axis 8 via the casing CA and by means of drive means (not shown), as indicated by an arrow 9.

Once the membrane 1 has been coated with liquid plastic 7, following a waiting time that depends on the material properties to be achieved and as a function of the properties of the plastic 7 used for the coating operation, the plastic 7 is cured as explained in more detail below with reference to FIG. 3.

Figure 2:
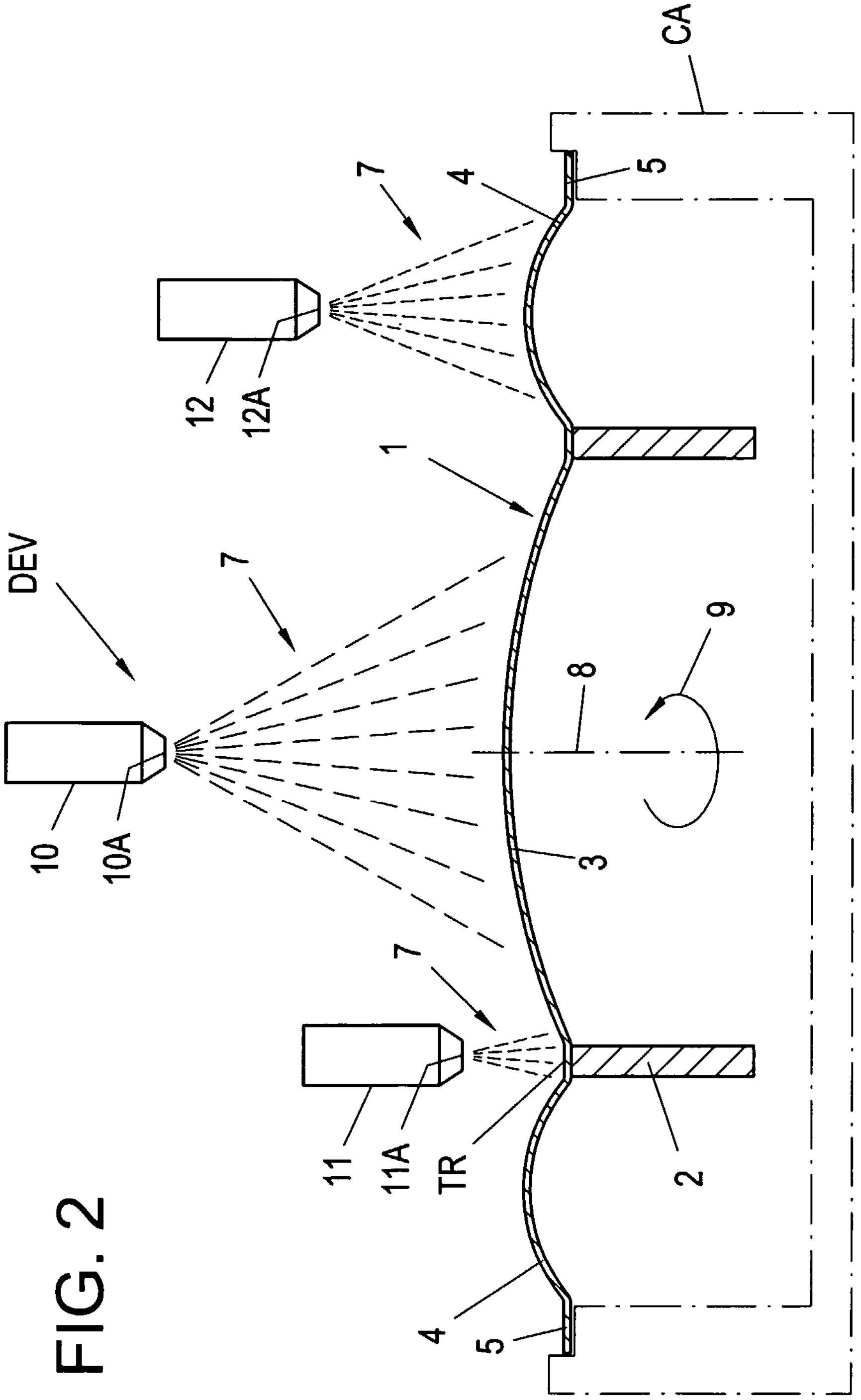
FIG. 2 shows, in a view similar to FIG. 1, a device according to the invention in accordance with a modified example of embodiment for carrying out the method according to the invention, wherein a plurality of spray nozzles are provided for applying liquid plastic to the surface of a membrane.

FIG. 2 shows a device DEV for producing a membrane 1 for a loudspeaker in accordance with a modified embodiment.

Unlike the device DEV shown in FIG. 1, in the device DEV shown in FIG. 2 it is provided that a first spray nozzle 10 for applying the liquid plastic 7 is provided for the inner zone of the central region 3 of the membrane 1. Furthermore, a second spray nozzle 11 is provided for applying a liquid plastic 7 in the transition region TR between the central region 3 and the creased region 4, and a third spray nozzle 12 is provided for applying the liquid plastic 7 to the surface of the membrane 1 in the creased region 4.

By providing a plurality of spray nozzles 10, 11 and 12 as application devices for applying a liquid plastic 7 to the surface of the membrane 1, it is possible, by selecting possibly different liquid plastics 7 for the membranes to be produced, to achieve different material properties of membranes for loudspeakers, so that the loudspeakers are tailored to different requirement profiles. Since the membrane 1 can once again be driven in rotation about the central axis 8 in the direction of the arrow 9, complete coating of selected part-areas of the membrane 1 can be carried out by means of appropriately dimensioned spray nozzles 10, 11 and 12 for applying the liquid plastic 7, for example whole-surface coating of the creased region 4 by means of the spray nozzle 12 along the entire tangential extent of the crease region 4 of the essentially circular membrane 1.

Besides using different liquid plastics to be applied in the various spray nozzles 10, 11 and 12, it is also possible to apply different amounts per unit time or per unit area to different part-areas of the membrane 1 using the various spray nozzles 10, 11 and 12, in order in this way to create—starting from a membrane 1 having a uniform thickness and thus uniform material properties—part-areas of the membrane 1 which after coating have different material properties, for example different rigidity and damping, so that the loudspeaker to be produced can have desired acoustic properties, said properties being determined by the material properties of the membrane 1.

Figure 3:
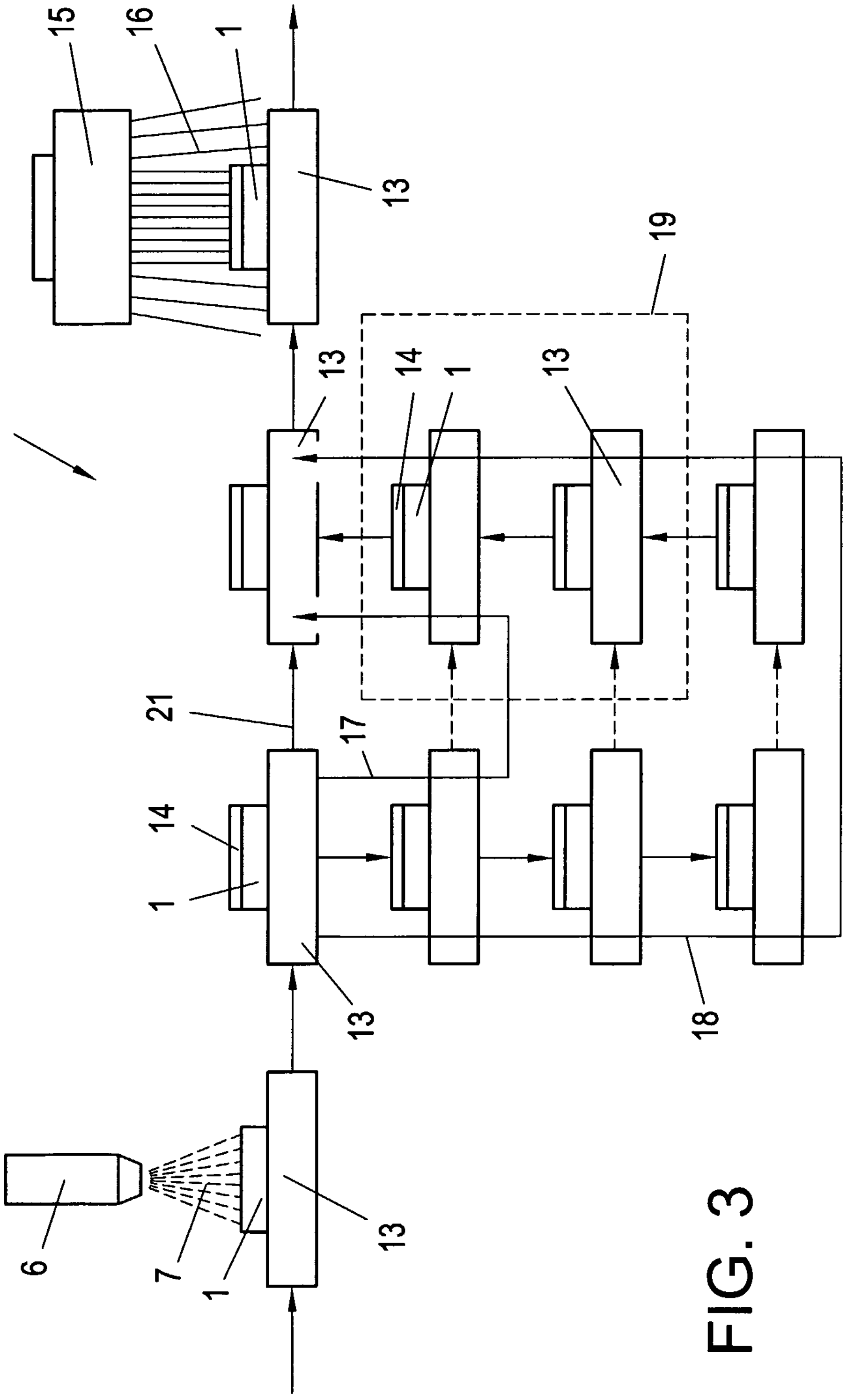
FIG. 3 shows a schematic flowchart of a production process for producing a membrane for a loudspeaker in accordance with the method according to the invention, wherein it can be seen in particular that different waiting times or residence times are provided between the coating of the membrane and the curing of the applied liquid plastic.

FIG. 3 schematically shows a flowchart of a production method, wherein the step of applying a liquid plastic 7 is shown in a highly schematic manner, said step being shown in detail in FIGS. 1 and 2.

In FIG. 3, the application device 6 for applying liquid plastic 7 and the membrane 1 to be coated and holding means 13 for holding the membrane 1 are shown in a highly schematic manner. In the flowchart shown in FIG. 3, different positions of the holding means 13 together with the membrane 1 held by the holding means 13 are shown after a clock time of for example one (1) second. A plastic layer 14 that exists on the membrane 1 after the coating step is also shown in a highly schematic manner.

Depending on the liquid plastic 7 used to produce the plastic layer 14 and on the material properties to be achieved, once the coating operation has been carried out, for example during two clock units, a membrane 1 can be fed directly to a curing device 15 for curing the applied liquid plastic 7, wherein curing takes place for example by visible light or UV light 16, once again depending on the liquid plastic 7 used.

As explained in more detail below with reference to FIG. 5 in particular, if a short rest time or residence time is observed between the coating by means of the application device 6 and the curing by means of the curing device 15, an essentially uniform coating is achieved over the entire coated surface of the membrane 1.

The different positions of the holding means 13 with a membrane 1 arranged thereon in each case are achieved by means of a conveying system that is preferably driven automatically.

Instead of observing a short residence time between the coating and curing operations, as shown by a direct first process path 21 along the top line in FIG. 3, by suitably controlling or managing the conveying system it may be provided that further clock units are provided in order to achieve longer rest times or residence times between the coating and curing operations, as shown by a second process path 17 which is longer than the first process path 21 and also by a third process path 18 which is longer than the first process path 21. If the second process path 17 or third process path 18 is followed, it is moreover provided that the holding means 13 with the membrane 1 and the plastic layer 14 arranged thereon are guided through a heating device 19 (shown schematically) for heating the plastic layer 14 between the coating and curing operations, as a result of which a more or less uniform distribution of the plastic layer

14 on the surface of the coated membrane 1 can be achieved for example as a function of the temperature.

In the present case, photoinitiated acrylates, which cure under the action of light with a wavelength of between 350 nm and 450 nm are used for example as liquid plastic. The temperature range is for example between room temperature and 70° C. The curing time is approximately 0.5 s to 6 s at a light intensity of 200 mW/cm$^2$ to 5000 mW/cm$^2$.

However, it should be mentioned at this point that other process parameters exist if other materials are used, such as light-activated epoxy resins for example. In this case, the curing takes place for example in a temperature range between room temperature and 160° C. The curing time is likewise approximately 0.5 s to 6 s at a light intensity of 200 mW/cm$^2$ to 5000 mW/cm$^2$.

Figure 4:
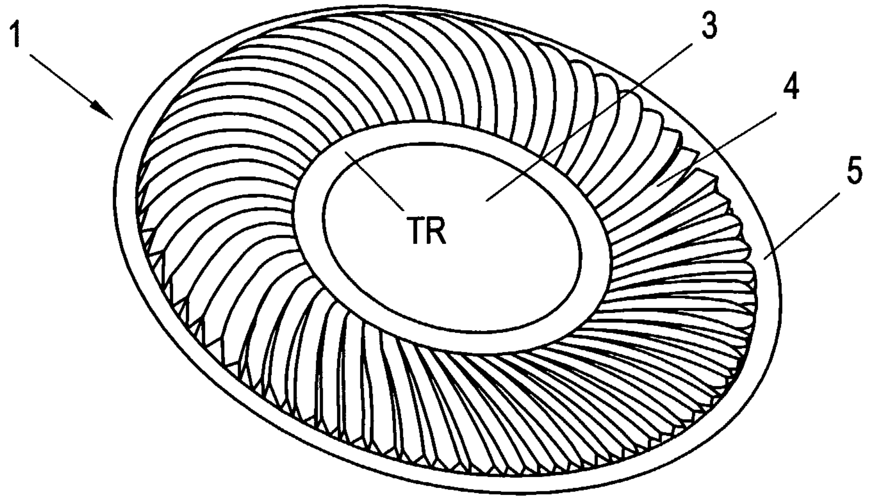
FIG. 4 shows, in a perspective view and partially in section, a membrane for use in the method according to the invention.
Figure 5A:
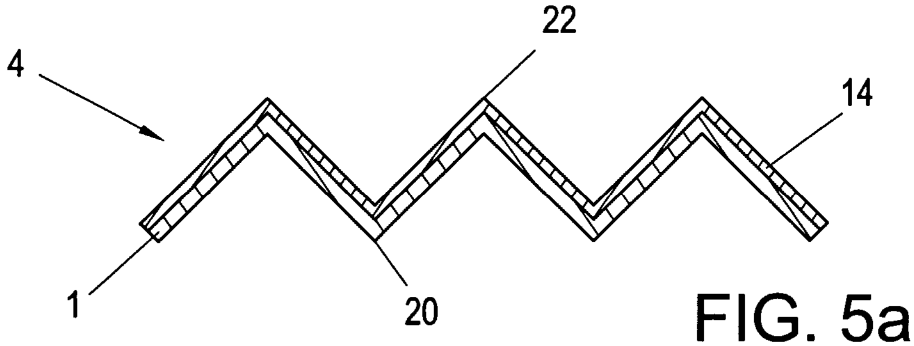
FIG. 5*a* shows, in section and on a larger scale than FIG. 4, part of the membrane of FIG. 4, which membrane has a coating cured after a relatively short residence time.
Figure 5B:
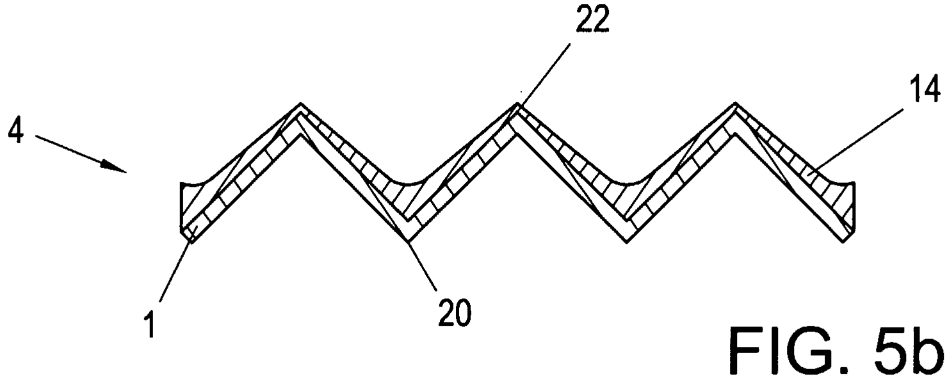
FIG. 5*b* shows, in a view analogous to FIG. 5*a*, part of a membrane, which membrane has a coating cured after a relatively long residence time and possibly after intermediate heating.

If the membrane 1 is designed with the crease region 4, which crease region 4 comprises depressions 20 and raised areas 22, as shown in FIG. 4, a greater accumulation of plastic, that is to say of coating material, can be achieved in the depressions 20 by observing or selecting the longer process paths 17 and 18, as shown in detail in FIG. 5*b*.

While an essentially uniform plastic layer 14, as shown in FIG. 5*a*, can be achieved by observing a short residence time of for example two (2) seconds between the coating and the curing operations, it can be seen from the diagram in FIG. 5*b* that in each depression 20 the coating material has a greater material thickness, and this can be achieved by observing longer residence times or process times in accordance with the longer process paths 17 and 18. Providing the heating device 19 for heating purposes can additionally assist such an accumulation of coating material. It should be mentioned at this point that the heating device 19 for heating purposes may also be designed for heating certain regions, that is to say for example for heating the plastic 7 applied in the crease region 4 or in the central region 3.

It is shown in FIG. 3 that the temporal spacing between the individual steps is for example one (1) second, so that it is immediately obvious that a coated membrane 1 for a loudspeaker can be produced with short clock rates or in short periods of time.

It may be mentioned that even a membrane 1 having a shape other than an essentially circular shape, such as an elliptical or rectangular shape for example, can likewise be influenced in a targeted manner in terms of its material properties by coating with and curing a liquid plastic.

It may furthermore be mentioned that, instead of said plastic adhesive, other liquid plastics may be used which can be cured in a similar manner after application in order to achieve a coated surface of the membrane 1.

It may furthermore be mentioned that, instead of the rotation movement of the holding means 2 for the membrane 1 which is shown in FIGS. 1 and 2, devices or nozzles which are provided for example in the circumferential region of the membrane 1, as can be seen in particular from FIG. 2, may be moved relative to a stationary membrane 1.

It may furthermore be mentioned that, instead of the essentially punctiform spray nozzles 6, 10, 11 and 12 as application devices for applying the liquid plastic 7 for example for the circumferential regions shown in FIG. 2, slit-shaped nozzles or nozzle arrangements having dimensions adapted to the circumferential shape of the membrane 1 may also be used.

It may furthermore be mentioned that membranes for loudspeakers having different material properties (in particular rigidities) for achieving desired damping which are adapted to the specific use purpose may be obtained in a simple manner essentially without using a device DEV shown for example in FIGS. 1 and 2, merely by selecting appropriate coating materials.

It may furthermore be mentioned that use may be made not only of the damping properties of the coating material for the membrane 1 that is to be produced, but rather for example also membranes which on account of low wall thicknesses are too soft or have too low a mechanical strength for the production of membranes for loudspeakers for specific use purposes can be given the necessary acoustic rigidity by selecting an appropriate coating material which in particular increases the hardness of the membrane produced. This advantageously means that, starting from a single material for a membrane for example, a so-called basic membrane can be produced which is intended for a wide range of types of loudspeaker and which is adapted to the specific requirement profile of the various types of loudspeaker by targeted spraying with the liquid plastic or the plastic adhesive. It has furthermore proven to be particularly advantageous in this connection if the loudspeaker or even so-called acoustic modules, which comprise a loudspeaker are adapted to type-specific requirement profiles in a final production step by spraying with plastic or plastic adhesive.

It may furthermore be mentioned that it is also possible to provide a membrane at least partially with a plastic layer on both surfaces, in order to obtain advantages according to the invention.

It may furthermore be mentioned that the curing operation need not start after the application operation is complete but rather the two operations can also overlap at least partially in terms of time, with the start of the curing operation being before the end of the application operation.

It should furthermore be mentioned that the membrane can be sprayed with the liquid plastic even in an uninstalled state, that is to say after a deep-drawing process, on a membrane support on the way to a paletting or storage device, and the plastic is cured as mentioned above. It may furthermore be provided that a membrane already installed in a loudspeaker is accordingly treated, as long as a casing has not yet closed the loudspeaker.

The invention claimed is:

1. A method of modifying the properties of a pre-formed membrane for an electroacoustic transducer, the method comprising:

applying at least one liquid plastic with adhesive properties at least in part-areas of at least one surface of the pre-formed membrane, the part-areas including a central area, a transition area and a creased area of the at least one surface of the membrane, the transition area being situated to surround the central area, the creased area being situated to surround the transition area, the transition area being configured to be coupled to a moving coil of the electroacoustic transducer, wherein the applying of the at least one liquid plastic includes spraying a first liquid plastic of the at least one liquid plastic exclusively to the central area using a first spray nozzle, spraying a second liquid plastic of the at least one liquid plastic exclusively to the transition area using a second spray nozzle, and spraying a third liquid plastic of the at least one liquid plastic exclusively to the creased area using a third spray nozzle;

heating the at least one liquid plastic applied on the surface of the pre-formed membrane to produce a more uniform distribution of the at least one liquid plastic on the surface of the membrane; and curing the at least one applied liquid plastic after heating.

2. A method as claimed in claim 1, wherein the curing of the at least one liquid plastic is carried out by means of visible light or by means of UV light.

3. A method as claimed in claim 1, wherein the pre-formed membrane and/or a device for applying the at least one liquid plastic is rotated about its central axis during the application of the at least one liquid plastic.

4. A method as claimed in claim 1, wherein at least one waiting time or residence time of between one and fifteen seconds is selected between the application of the at least one liquid plastic and the curing of the at least one liquid plastic.

5. A method as claimed in claim 4, wherein, in the case of a membrane having a number of raised areas and depressions a waiting time or residence time is selected which is greater than a waiting time or residence time in the case of a membrane having a smooth surface.

6. A method as claimed in claim 1, wherein the ratio between the layer thickness of the at least one applied plastic and the pre-formed membrane thickness is selected to be between 0.5:1 to 3:1.

7. A method as claimed in claim 1, wherein the at least one liquid plastic is applied to the pre-formed membrane a number of times in succession and wherein the at least one liquid plastic is cured after each application.

8. A method as claimed in claim 1, wherein different amounts of liquid plastic per unit time or per unit area are sprayed to the central area, the transition area and the creased area of the at least one surface of the membrane using the fist, second and third spray nozzles such that the central area is sprayed with a first amount of liquid plastic by the first spray nozzle, the transition area is sprayed with a second amount of liquid plastic by the second spray nozzle, and the creased area is sprayed with a third amount of liquid plastic by the third spray nozzle.

9. A method as claimed in claim 1, wherein different types of liquid plastic are sprayed to the central area, the transition area and the creased area of the at least one surface of the membrane using the first, second and third spray nozzles such that the central area is sprayed with a first type of liquid plastic by the first spray nozzle, the transition area is sprayed with a second type of liquid plastic by the second spray nozzle, and the creased area is sprayed with a third type of liquid plastic by the third spray nozzle.

10. A method as claimed in claim 1, wherein the at lest one liquid plastic includes a photoinitiated acrylate that is configured to be cured under the action of light with a wavelength of between 350 nm and 450 nm.

* * * * *

UNITED STATES PATENT AND TRADEMARK OFFICE

CERTIFICATE OF CORRECTION

PATENT NO. : 8,628,830 B2
APPLICATION NO. : 10/589923
DATED : January 14, 2014
INVENTOR(S) : Amon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 934 days.

Signed and Sealed this
Twenty-second Day of September, 2015

Michelle K. Lee

Michelle K. Lee
*Director of the United States Patent and Trademark Office*